United States Patent [19]

Petering

[11] Patent Number: 5,545,326

[45] Date of Patent: Aug. 13, 1996

[54] METHOD AND APPARATUS FOR THE TREATMENT OF CONCENTRATED WASTEWATER

[76] Inventor: John L. Petering, 804 S. Broad St., Mankato, Minn. 56001

[21] Appl. No.: 364,258

[22] Filed: Dec. 27, 1994

[51] Int. Cl.⁶ .................................................. C02F 3/30
[52] U.S. Cl. .......................... 210/605; 210/622; 210/623; 210/630; 210/195.1; 210/202; 210/258; 210/903; 210/906
[58] Field of Search ...................... 210/605, 614, 210/620, 621, 622, 623, 624, 630, 195.1, 198.1, 258, 260, 903, 906, 202

[56] References Cited

U.S. PATENT DOCUMENTS

| | | | |
|---|---|---|---|
| RE. 29,781 | 9/1978 | McWhirter | 210/604 |
| 3,699,776 | 10/1972 | LaRaus | 210/192 |
| 3,772,187 | 11/1973 | Othmer . | |
| 3,864,246 | 2/1975 | Casey et al. . | |
| 3,911,064 | 10/1975 | McWhirter et al. . | |
| 4,042,494 | 8/1977 | Stoyer . | |
| 4,163,712 | 8/1979 | Smith . | |
| 4,192,742 | 3/1980 | Bernard et al. | 210/617 |
| 4,199,452 | 4/1980 | Mandt . | |
| 4,210,680 | 7/1980 | Dawson et al. . | |
| 4,257,897 | 3/1981 | Krichten et al. | 210/605 |
| 4,340,484 | 7/1982 | Pollock et al. . | |
| 4,384,956 | 5/1983 | Mulder | 210/605 |
| 4,415,452 | 11/1983 | Heil et al. | 210/614 |
| 4,419,243 | 12/1983 | Atkinson et al. . | |
| 4,488,967 | 12/1994 | Block et al. | 210/605 |
| 4,501,664 | 2/1985 | Heil et al. | 210/614 |
| 4,522,722 | 6/1985 | Nicholas | 210/605 |
| 4,582,600 | 4/1986 | Atkinson et al. . | |
| 4,645,603 | 2/1987 | Frankl . | |
| 4,749,494 | 6/1988 | Tomoyasu et al. | 210/631 |
| 4,845,034 | 7/1989 | Menger et al. . | |
| 4,867,883 | 9/1989 | Dagger et al. | 210/605 |
| 4,999,111 | 3/1991 | Williamson . | |
| 5,087,378 | 2/1992 | Kovacs . | |
| 5,137,636 | 8/1992 | Bundgaard | 210/605 |
| 5,213,681 | 5/1993 | Kos | 210/605 |
| 5,342,522 | 8/1994 | Marsman et al. | 210/605 |
| 5,380,438 | 1/1995 | Nungesser | 210/605 |

OTHER PUBLICATIONS

"Autothermal Thermophilic Aerobic Digestion", company brochure, Krüger, Cary, North Carolina.

*Primary Examiner*—Peter A. Hruskoci
*Assistant Examiner*—Theodore M. Green
*Attorney, Agent, or Firm*—Haugen and Nikolai, P.A.

[57] ABSTRACT

A pressurized process for the treatment of high-solids wastewater having relatively high BOD and phosphorus concentration includes anaerobic and aerobic treatment. The treated wastewater effluent is discharged in an environmentally safe manner such that the residue BOD and P are concentrated in the solid fraction which may be a source of protein.

13 Claims, 2 Drawing Sheets

5,545,326

METHOD AND APPARATUS FOR THE TREATMENT OF CONCENTRATED WASTEWATER

BACKGROUND OF THE INVENTION

I. Field of the Invention

The present invention is directed generally to improvements in the treatment of concentrated aqueous waste streams having a significant content of organic matter and, more particularly, to a process for rendering sludges of high solids content in which the solids have a relatively high biological oxygen demand (BOD).

II. Related Art

Wastewater treatment has been and continues to be a matter of great environmental importance. This includes addressing issues relating to industrial operations such as food processing plants, paper mills, and the like, in addition municipal sewage and animal waste treatment streams. Traditionally, organic matter containing excessive BOD has been treated using microbial action in a manner that separates the organic matter to form a mass of solids in the form of an activated sludge from the remainder or water fraction. The treatment problem is decidedly two-fold because the water and the sludge fractions both must be treated to be safely returned to the environment and the two fractions may contain different impurities to be removed.

Treatment typically involves digestion of the organic material through fermentation of the sludge involving aerobic or anaerobic bacterial action or some combination thereof. These processes are used to reduce or consume the chemical oxygen demand (COD) and biological oxygen demand (BOD) of the material and reduce them to an environmentally safe level in the organic materials. It is also necessary to remove undesirable inorganic materials from the water fraction which typically contains undesirable quantities of phosphorus and nitrogen compounds including phosphates and nitrates.

Problems associated with the keeping of large numbers of animals in close quarters have evolved to an acute stage in agriculture, particularly with respect to the growing requirements for treating animal waste associated with feedlots, animal barns or the like, where the organic matter to be treated is highly concentrated with respect to BOD, phosphorus and nitrogen content and the conditions for legal disposal are continually becoming more restricted. In many areas, feedlots, for example, are required to be licensed by state law or local ordinance so that the treatment and disposal of such biological wastes are carefully monitored. In Minnesota for example, feedlots having 300 or more animal units are affected and, according to 1990 Minnesota Agricultural Statistics Service data, 14,000 feedlot operators have 300 animal units (an animal unit is ~1000 lbs of animal such as 1–1000 lb bovine or 2.5 large hogs) or more and so are in the regulated category. The cost associated with compliance with regulations affecting animal waste disposal is generally quite high and is increasing as regulations become more restrictive.

Additionally, existing processes and installations for the treatment of such wastes have generally been large scale operations having installation costs measured in terms of millions of dollars such as associated with typical municipal treatment plants, or the like. Most known treatments or processes also are generally directed to treating dilute concentrations of organic matter with relatively low BOD.

Wastewater from feedlots or animal barn grated or troughed floors, however, contains from about 0.5–10% organic solids. Even if this effluent be diluted with additional wash down water, it remains a highly concentrated biomass with respect to BOD and COD. In contrast to typical municipal wastewater treatment facilities which are designed to treat relatively dilute waste sludge having a BOD in the neighborhood of 200 mg/l or 200 parts per million (ppm). The barn or feedlot wash down effluent may have a BOD of 10,000–100,000 mg/l (ppm) or more than an order of magnitude greater than the level most existing processes are prepared to meet. Because of this, a great deal more oxygen per unit volume of wastewater is required to reduce the BOD/COD to an acceptable level and make the material more olfactorily acceptable.

Systems have been proposed for the aerobic treatment of liquid borne biowastes in which the oxygen potential has been enriched or elevated above that which normally dissolves in the liquid at atmospheric pressure. For example, Smith, in U.S. Pat. No. 4,163,712, introduces the gas into an inlet stream under pressure and turbulent conditions to produce an input stream containing oxygen in amounts greatly in excess of the equilibrium saturation value, the excess forming finely dispersed bubbles therein. This stream is caused to enter at a low level near the bottom of an unpressurized main biomass to allow the undissolved gas to bubble through the main mass when the pressure is released and to dissolve in the main body of liquid as it rises, thereby replenishing the available oxygen. In this manner, oxygenation of the main reactive biomass may be maintained at a higher level.

Such a system, however, to be practical requires an oxygen-containing gas mixture having an enriched oxygen content (i.e., greater than that of air) and preferably close to that of pure oxygen, which, of course, is too expensive to be practical in a relatively small scale system such as would be operated by an individual, for example, as it would require a continuous source of liquid oxygen or the like to produce highly enriched air. Franco (U.S. Pat. No. 4,645,603) discloses a system that uses jet ejectors to aerate an unpressurized open holding tank 5 to 20 feet in depth in which the air is supplied from an open-ended mixing tube at a pressure slightly above the pressure of the hydraulic head of the tank (at the depth of the tube) and released to bubble through the reacting biomass.

In other approaches, a part of the system is pressurized to increase the oxygen solubility. These include Stoyer (U.S. Pat. No. 4,042,494) in which oxygen is dissolved at high pressure toward the lower end of an extremely long inclined reactor pipe, preferably >1000 feet long, through which the biomass travels, such that the oxygen bubbles through the agglomeration and reacts as the material is pumped along the pipe. Pollock et al, in U.S. Pat. No. 4,340,484, employ an open vertical shaft which may be upwards of 500 feet high in the form of a downcomer and riser connected in a bottom loop to attain high pressure dissolution capabilities. Air is added to the waste liquor toward the bottom of the riser portion of the vertical shaft such that, as released the dissolved oxygen equilibrium is at a maximum and thereafter oxygen is continually consumed as the material rises along the riser portion and the pressure (and oxygen equilibrium solubility) correspondingly decreases.

Additionally, systems and methods have been devised for anaerobically treating wastewater to remove phosphorus using phosphorus consuming microorganisms. U.S. Pat. No. 4,999,111, to Williamson, deals with the removal of phosphorus and nitrogen, particularly from wastewater of relatively low BOD to P ratio using both oxic and anoxic zones where nitrogen, phosphorus and other pollutants are removed. The process requires a fraction of the primary sludge to be fermented to soluble organics to provide sufficient nutrients to sustain the phosphorus consuming and denitrification systems.

It can be seen from the above that a proliferation of approaches to dealing with wastewater have been proposed, including some directed toward increasing the maximum $O_2$ respiration rate. These processes and techniques, however, for the most part have been quite expensive to operate such as those requiring the provision of enriched air or pure oxygen or extremely large and impractical to install as those requiring extremely deep shafts or elongated tubular pipe devices. There clearly exists a need to provide a compact, low-cost system and method for treating concentrated wastewater (10,000–100,000 mg/l BOD) as exists in wash down water from feedlots and animal barns that can be applied to localized operations.

Accordingly, it is a primary object of the present invention to provide a method and apparatus for processing concentrated wastewaters of high BOD content in a compact, low-cost system that can be designed to accommodate effluent from individual operations.

Another object of the present invention is to provide a method and apparatus for processing concentrated wastewater that can be installed at the site of the operation and connected directly thereto.

Yet another object of the present invention is to provide a method and apparatus for processing concentrated wastewater of high BOD that also is capable of biologically removing phosphorus.

A further object of the present invention is to provide a method and apparatus for processing concentrated wastewater of high BOD that also is capable of biologically removing nitrogen.

Still another object of the present invention is to provide a method and apparatus for processing concentrated wastewaters of high BOD that maintains a high level of dissolved oxygen in the primary reactor without the need to use enriched air or added oxygen.

Yet still another object of the present invention is to provide a method for processing concentrated wastewaters of high BOD content that produces an effluent suitable for spreading in fields or use as a high-protein feed.

Other objects and advantages associated with the present invention will be gleaned by those skilled in the art upon appreciation of this specification.

SUMMARY OF THE INVENTION

The present invention solves many of the problems associated with prior wastewater treatment methods and facilities by providing a process together with a compact, low-cost wastewater treatment system that removes up to 95% of the BOD from high BOD agricultural animal waste. The method includes both an aerobic step in which BOD is metabolized and an anaerobic step to resorb or metabolize phosphorus. Both the anaerobic and aerobic steps are performed utilizing the same naturally occurring heterotropic bacteria which become conditioned to withstand high pressures and temperatures up to 150° F. (65° C.). The bacteria having absorbed or metabolized phosphorus and thereafter large amounts of BOD may be used as single cell high protein sources in a conditioned feed.

The process is designed to process wastewater feed containing from about 0.5–10% finely divided solids and having a relatively high BOD, i.e., as high as 10,000–100,000 and generally relatively high P and N content, i.e., up to about 1% P and up to about 1% N. The feed material may be obtained from a direct connected flushing system for one or more sources of wastewater such as barns or feedlots and is emaciated (finely pulverized) and pressurized to a pressure from 3 to 10 atmospheres (45–150 psia) and pumped to be initially subjected to an anoxic reaction stage with partially treated material containing active heterotropic bacteria. During a residence time of about 10–60 minutes, the residual dissolved and mineral $O_2$ is used up and the bacteria act anaerobically to assimilate phosphorus from the feed. This relatively low phosphorus material is then introduced to an aerobic reaction stage and joins a very high flow recycle stream where pressurized air from a source, preferably a compressor, is bubbled through the mass to provide maximum dissolved $O_2$ saturation as it mixes concurrently into the aerobic stage at relatively high oxygen uptake containing the remaining other biomass undergoing BOD metabolism. The aerobic action and recycling continues for an average of about 2 to 60 hours residence time in which generally 30–95% of the BOD is absorbed or metabolized. Additional aerobic stages may be used if desired. The reacted material is discharged, preferably using pressure reduction stages, to atmospheric pressure and may be sprayed over a lagoon or deep pit cooling pond or other suitable disposition site where settling occurs, the solid and liquid fractions being suitable for spreading on the land.

The method of the system of the present invention may readily be used to process animal wastes from a single agricultural operation such as a family farm or feedlot. The system reduces the cost of disposal of the animal wastes and may even represent a cost-effective method of recycling protein. A typical operation of 1100 animal units requires a system capable of processing about 3.0 gpm of wastewater.

DETAILED DESCRIPTION

Figure 1:
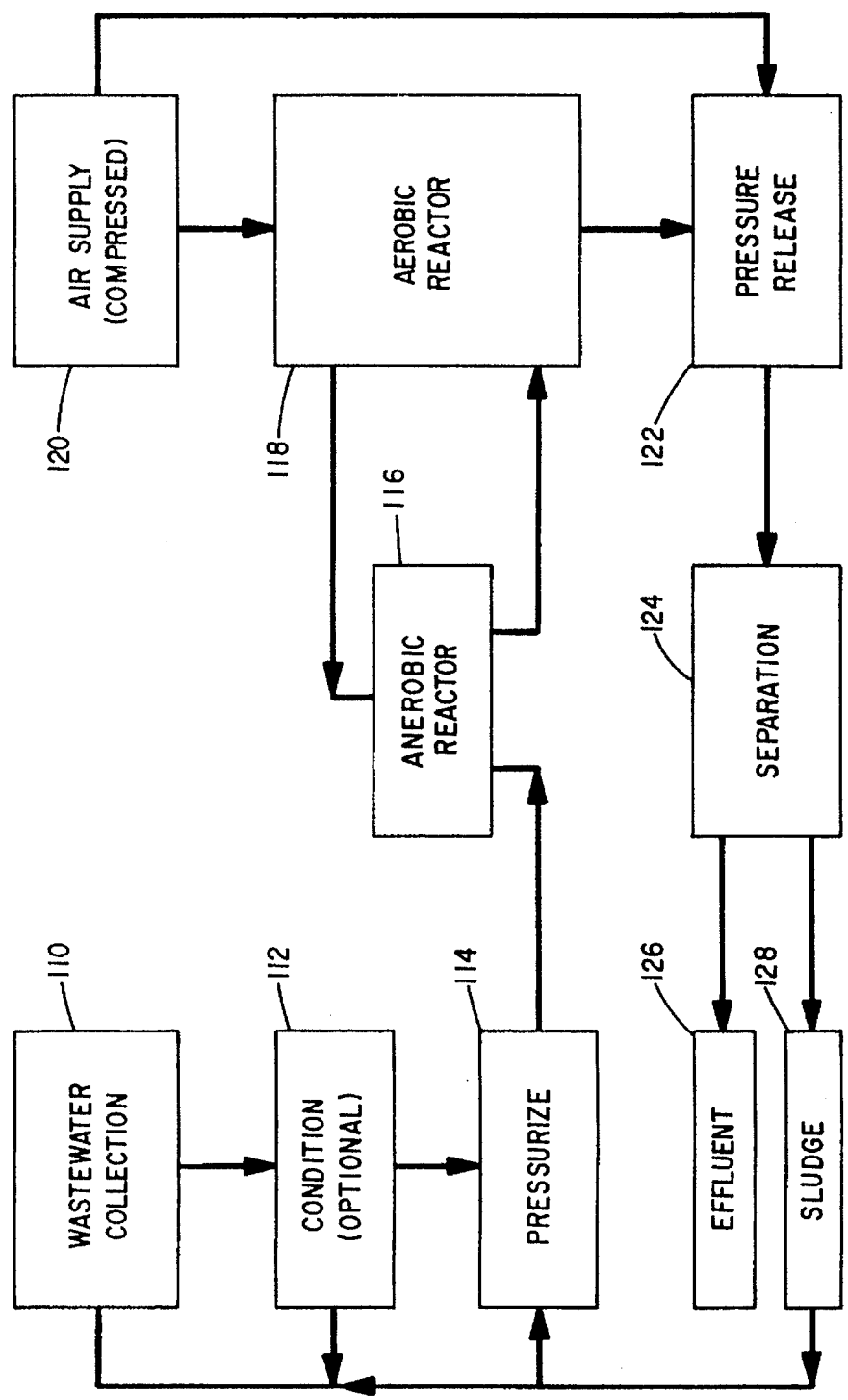
FIG. 1 is a schematic block diagram of the process of the invention.
Figure 2:
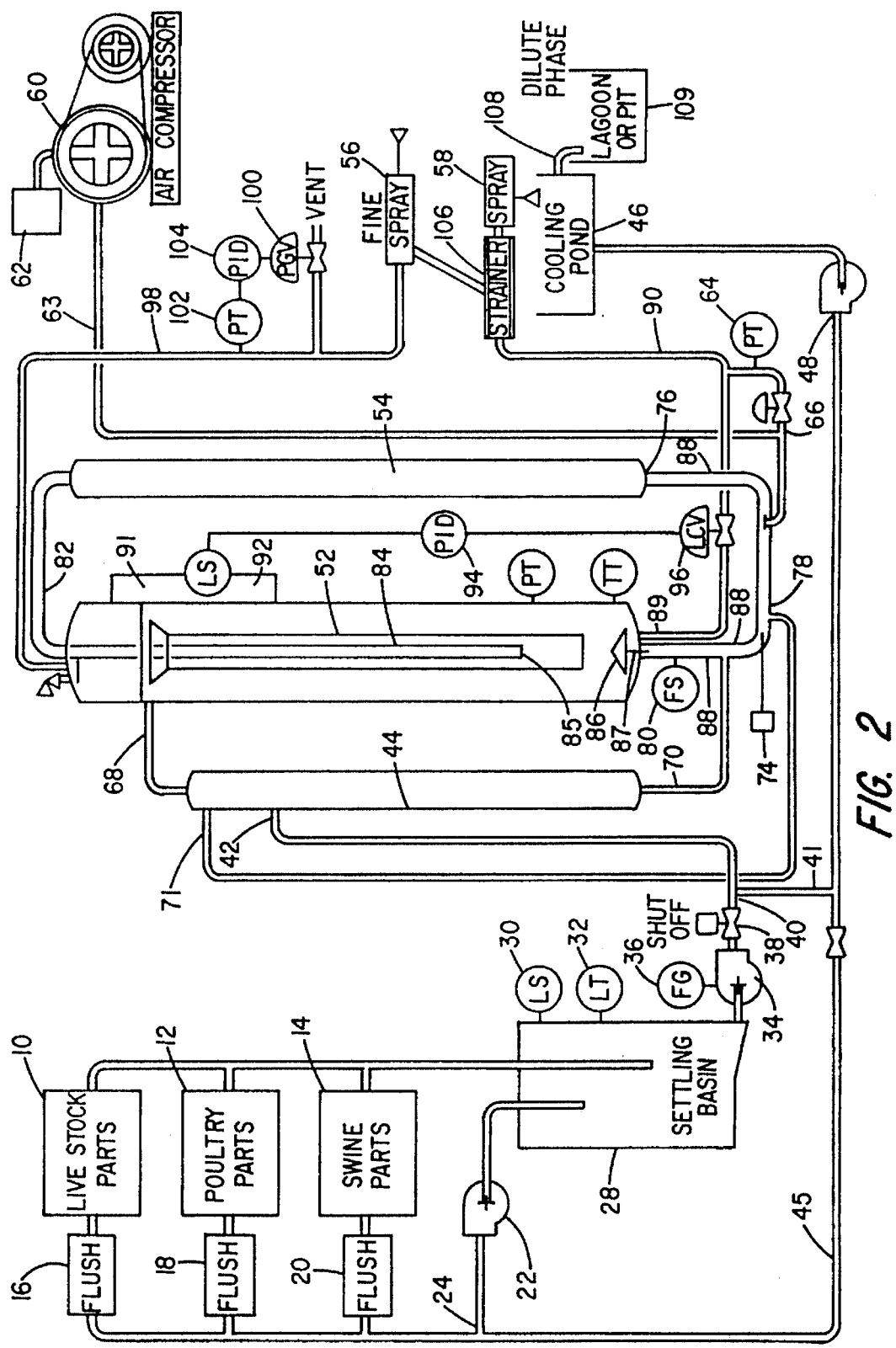
FIG. 2 depicts a detailed embodiment of an apparatus for performing the process of the schematic diagram of FIG. 1.

One embodiment of the process appears in a simplified schematic diagram in FIG. 1 and specific apparatus appears in FIG. 2. FIG. 2 is intended to be representative of an apparatus that can be used to perform the process but is clearly presented by way of example and by no means with any intention to limit the scope of either the process or the types of apparatus capable of performing it.

FIG. 1 depicts the general schematic of the process of the invention in block form. The schematic gives a general overview of the process which is explained in greater detail with respect to the schematic drawing of FIG. 2. Thus, wastewater collected at 110 which contains up to about 10% solid organic waste is optionally conditioned as by emaciating or pulverizing at 112. The material is allowed to settle and the generally liquid fraction may be recycled as part of the collection system and the more concentrated solid material pressurized and pumped at 114 into an anaerobic reactor 116 where heterotropic bacteria acting anaerobically remove phosphorus from the organic waste thereafter is reacted aerobically in an aerobic reactor at 118. Compressed air supplied at 120 maintains relatively high dissolved oxygen content in the aerobic reactor 118. After sufficient aerobic reaction has reduced the BOD to the desirable amount, pressure is released, normally in stages, as at 122 and the liquid and sludge fractions are separated at 124 into basically a liquid effluent 126 and a sludge fraction 128. A portion of the sludge fraction may be recycled as shown and with respect to the aerobic reactor 118, a portion of the material in that reaction is normally added to the anaerobic reactor 116 to assure sufficient bacterial activity in the aerobic reactor. Each of the steps will be treated in greater detail in conjunction with describing the operation of the apparatus depicted in FIG. 2.

FIG. 2 depicts a simplified apparatus for performing the treatment process of FIG. 1 as connected to a typical animal operation. The system as shown is designed to be installed as a single-farm or feedlot based water treatment system. Of course, systems of any size and complexity are contemplated and could be implemented using the present invention.

In FIG. 2, a plurality of barns are illustrated by the blocks 10, 12 and 14 in which animal wastes are collected in systems that have shallow troughs that are frequently flushed or possibly in deep pits, depending on the nature of the building used. The system of the present invention may be adapted to work with either type but preferably is associated with the constantly flushed system. Flush tanks or holding devices are depicted at 16, 18 and 20. A pump 22 utilizes recirculating flush water as in line 24 optionally strained to remove solids to provide either continuous or intermittent wash down of the barns and flushing of the tanks 16, 18 and 20. Optionally, odor control material or an antibacterial material can be added to the flush water if desired. This allows the liquid fraction of the material with an amount of make-up water to be recirculated as flush water.

Pit systems can be also converted to shallow readily flushed systems by, in effect, using an upper barrier which can be flushed clean and diverting the material from the deep pit to the processing system of the invention. In this manner, a barrier sheet sloped toward the center can be carried on top of the pit system using flotation cushions and a flexible or articulated pipe installed that connects to the low point in the center of the barrier sheet such that the waste can be removed in accordance with the flushing system associated with the invention. The floating sheet appears somewhat like capsized life rafts and can be connected as necessary under the slotted floor of a deep pit system to provide a complete barrier between the fresh waste and the effluent from the aerobic process.

The material flushed from the barns or feedlots normally contains from about 0.5–10% sold material and a stream including the flush water approximately up to 10% solid material. If we assume a typical 1100-animal unit operation, the typical net increase in sludge material to be flushed is about 3 gallons per minute (gpm). A typical recirculation pump 22 probably would deliver about 100 gpm in continuous recirculation in a system of this size. The material is delivered to an inlet or receiving tank 28.

Devices such as emaciators (not shown) may be provided to chop or otherwise divide up the solids in the material to be carried from the flush tanks 16, 18 and 20 prior to entry into a settling receiving tank 28, such that only pulverized entrained solids are contained in the flushing stream moved by a continuous recirculation pump 22. This would further prevent the build up of solids on screens or classifiers and prevents line blockage from hulls and fibers and other non-digestible material contained in the solids. Continued circulation of the material further breaks up any particles too small to pass through the screens initially.

The material enters the receiving tank 28 which is provided with a high liquid level switch 30 and level transmitter 32 which control the operation of a treatment system feed pump 34 such that the level of material in the receiving tank can be maintained at a desired level. An amount of material pumped from the receiving tank and recirculated about the flushing system is taken from the liquid fraction at the top of tank and the majority of the solid sludge material settles to the bottom where it is pumped intermittently or continuously into the treatment system by the pump 34. Pump 34 may also have associated emaciating capabilities if desired to divide the solid material. The material pumped by pump 34 is in the form of a sludge containing about 0.5–10% finely divided active solids plus extraneous solid material carried along in the flow. The flow controller is shown at 36 and a reverse flow-preventing shut-off valve, typically a solenoid, is shown at 38 which cooperate to produce a controlled pressurized feed stream in line 40 which is conducted to an inlet 42 of an anoxic/anaerobic reaction vessel 44. Optionally, an amount of recycled reacted active sludge material from the output solid storage lagoon, cooling pond, deep pit or other storage facility 46 may be pumped as by a pump 48 and added to the input feed stream in line 40 via line 41 to produce a composite feed stream to the anoxic/anaerobic vessel 44. An amount of the reacted solid sludge material may also be recirculated into the flush stream in line 45, if desired.

An important aspect of the process of the invention is that it is carried out at elevated pressures beginning with the output of pump 34 through the anaerobic/aerobic zone at 44 and other major vessels including one or more large main aerobic reactor stage vessels 52, recycle or plug flow bubbler section 54 and up to the final discharge of the effluent as by spray nozzles 56 and 58. The system is maintained under a pressure preferably between about 4 and 8 atmospheres (atm) (60–100 psi) and most preferably between about 5 and 7 atmospheres (70–100 psi). Pressurization for the system is provided by the regulated addition of compressed air through line 63 as by utilizing a belt-driven compressor 60 with filtered air intake 62 which regulates the pressure within the system as detailed below.

An amount of material from the main reactor tank 52 is added to the anoxic/anaerobic vessel 44 through line 68 and/or 71 to the top of the anoxic/anaerobic zone. This material has already been reacted aerobically in the main tank 52 and so normally contains some oxygen ($\leq 5$ mg/l). The oxygen in the input 68, 71 is quickly used up and this input provides a continuous resupply of bacteria for anoxic or anaerobic activity with respect to the incoming feed stream. The rate of input 68, 71 is typically at or slightly above the rate of feed stream 40 or 3–6 gpm for a 3 gpm feed system. The optional recirculated sludge material in line 41 may be used as required to maintain a high solids level in the system.

The anaerobic chamber then normally contains an amount of bacteria from the recycled sludge and other heterotropic bacteria which enter from the main reactor through gravity line 68 or pumped line 71 so that a high level of anaerobic bacterial activity can be maintained.

In the anoxic tank or other zone 44, the bacteria absorb and metabolize the majority of the phosphorus in the incoming feed stream. Recirculation further conditions the species of bacteria to develop and adapt to carrying a high phosphorus content (hpc). Not only does this enable the effective removal of a large quantity of phosphorus from the feed, but because these hpc bacteria have increased energy available to absorb BOD constituents in the biomass later in the process. Cellular energy converts BOD to fat in the anaerobic zone during the absorption and metabolism of phosphorus and this later stored energy is regenerated or made available when the cell enters the aerobic reactor 52 via lines 70, 78 and 82 and there the fat is metabolized.

A continuous supply of air at 3–10 atm is required to digest the BOD absorbed by the bacteria and maintain a high dissolved $O_2$ level in the aerobic reaction. This mixing by the air occurs in a plug flow bubbler vessel 54, which may be a widened pipe section, or even part of the vessel 52 as a mixing zone, and in which the air rate is adjusted to maintain a high dissolved oxygen level for maximum oxygen uptake upon mixing and during entry into the reactor 52. The required amount, of course, is proportional to the specific oxygen uptake rate but the system is designed to maintain about 10 ppm dissolved oxygen at the maximum specific uptake rate (100 mg of oxygen per gm of biomass per hour).

Thus, compressor 60 supplies air through line 63 which mixes with and aerates the material of output of pump 74 in line 78 in the bubbler 54 entering at 76. A pressure indicating sensor may be provided at 80. In the bubbler section 54, the oxygen level is raised to the maximum based on air dissolved at the pressure under which the system is operating. The typical residence time of material in the bubbler system is approximately one-half to two minutes after which, as the plug flow progresses to the top of the vessel 54, it is transferred via line 82 to aerobic reactor vessel 52 and released close to the bottom of a standpipe or draft tube 84 at 85. In this manner, the material containing the greatest amount of oxygen obtains toward the bottom of vessel 52 and the $O_2$ content diminishes as the material moves either to the top or the bottom of the reactor. The reactor vessel 52 is provided with a deflector 86 to prevent material discharged into the vessel from the draft tube 84 from short circuiting through bottom discharge opening 87.

The vessel 52 typically uses some type of mixer, such as draft tube 84, to aid in dissolving compressed air and to maximize, or if possible, the amount of dissolved oxygen available to digest the absorbed BOD. Bacteria received from the anoxic or anaerobic reaction are especially primed to vigorously take part in the BOD metabolism under aerobic conditions. While one reactor vessel 52 is shown, additional reactor stages can be provided to handle additional material or further reduce BOD.

Material is discharged from the bottom of reactor 52 at 87 into line 88 and the vast majority is recirculated through the pump 74 and bubbler 54 at a high rate to maintain the high oxygen potential required and prevent overheating due to metabolism of the BOD in the vessel 52. Assuming a capacity of approximately 10,000 liquid gallons in the vessel 52, the recirculation rate utilizing pump 74 may be as high as 2,000 gpm. The bubbler system 54 is generally sized for about one-half to one minute contact between the aeration system and the recycle stream from the reactor 52 such that the pressurized air is supplied to the material continually as it recirculates between the reactor 52 and the bubbler system 54. It will be appreciated that the huge flow volume in draft tube or standpipe 84 together with the high rate of recirculation and replenishment under pressure keeps the dissolved oxygen content at or above 5 mg/l (ppm) so that a high rate of aerobic reaction may be maintained. The net amount of air used is generally about 40 scfm for a 3 gal/minute process.

Effluent material is released along lines 89, 90 based on controlling the liquid level in the reactor tank 52 using level sensors 91 and 92 together with proportional integral differential controller 94 and liquid control valve 96 which releases material to control the level between 91 92 or other desired level in the reaction vessel 52. As indicated, the compressed air utilized for approximately a 3 gpm waste feed sized system is nominally about 40 scfm incoming air. Effluent gas is discharged from the reactor vessel 52 via line 98 in a vent system, including vent valve 100, pressure transducer 102 and PID 104 which releases the necessary amount effluent to atmosphere and maintains the desired system pressure. A portion of the effluent may also be utilized through a strainer 106 to operate slurry sprays 56 (strained fluid) and also to operate spray 56 (unstrained fluid). A sludge blanket forms on cooling pond 46 owing the relatively high dissolved $O_2$ level in the effluent. The solids generally settle in the lower portion of the cooling pond 46 with the dilute liquid fraction or phase overflowing in line 108 to a lagoon or pit 109 where aerobic action continues. The BOD/COD metabolism of the pressurized process normally consumes approximately 80% of the available oxygen from the incoming compressed air so that the gaseous effluent contains approximately 4%–5% oxygen, up to 20% carbon dioxide ($CO_2$) and the balance nitrogen.

It will be appreciated that the high rate of recirculation and infusion of compressed air through the bubbler at 54 together with the operation of the system under elevated pressure assures maintenance of maximum dissolved air and the extreme high rate of circulation through the riser or standpipe 84 ensures continuous churning of the reactor vessel 52. High level of dissolved oxygen is maintained so that the high phosphorus content (hpc) bacteria can digest the preabsorbed fat at the maximum respiration rate or so that oxygen is not diffusion-limited through the cell wall. The small portion of the reactor fluid recycled through lines 41, 68 or 71 to the anoxic zone assures a continuous supply of sufficient bacteria to anaerobically resorb and metabolize the great majority of the phosphorus content of the feed.

The reactor fluid mixes with the incoming material in the feed stream 40 and remains in the vessel 44 for from 10 to 60 minutes. After the oxygen is used up in the system, the microbes absorb and metabolize the P values and develop a higher concentration of ATP in the cells. This allows the bacteria to thereafter absorb large amounts of BOD and convert it directly into cell fat. The conversion to fat is an exothermic reaction that evolves approximately 20 KCAL per kg of COD which compares with the release of 480 KCAL per kg of COD for the complete metabolism of the BOD to $CO_2$ and $H_2O$. The reactor conditions of the invention favor these microbes and they tend to actually dominate the species found in the process of the invention, washing out methane formers and other undesirable organisms that produce odors.

The material in the liquid fraction in the lagoon or pit 109 is sufficiently low in phosphorus that a greater quantity (as much as five times as much) can be spread over an acre of land. The high phosphorus material that settles in cooling pond 46 may eventually be used for high protein feed incorporated in the soil elsewhere.

The aeration of the high volume amount of material recirculated from the primary reactor 52 and including the amount discharged from the anoxic zone 44, may be accomplished in a large header pipe having holes in it or utilizing a sponge stone or other system which infuses the air from the compressor throughout the system as it flows in the header pipe. Thus, the vessel indicated indicated by 54 may actually be a section of enlarged diameter in the recirculation pipe which increases the residence time in the line by from one-half to one minute so that the oxygen in the air may dissolve to reach equilibrium. The draft tube or standpipe 84 is also sized (up to 1 meter in diameter) to assure vigorous mixing of the system at the pumping rates indicated.

The effluent from the spray nozzles can further be classified by splitting the stream with a screen. The fine liquid can then be atomized with the gas into 100 micron or smaller droplets that rapidly evaporate. The solids can be sprayed in a nozzle to make 1,000 micron diameter droplets and more evaporation will occur. Heat from the reaction as well as from the ambient air aid in the evaporation. Thus, the lagoon contains a high amount of solids. The discharge effluent from the spray nozzles 56, 58 preferably contains about 10–20% of the BOD of the input feed stream. The spray absorbs oxygen from the ambient air. The surface of both the lagoon 109 and cooling pond 46 into which it may be stored remains aerobic and further BOD reduction occurs over time.

It will further be appreciated that the P and N compounds will be predominantly contained in the solid fraction and not in the water. The great bulk of the phosphorus will be contained in the discarded bacteria and the nitrogen compounds will also remain in the solid fraction.

By requiring only the net feed stream of input pump 34 to be pressurized and maintaining system pressure using the make-up air compressor 60, the power requirements of the system are minimized. While under normal conditions the reactor will operate at a temperature of form between 100° F. and 140° F., cooling can be provided if necessary as by spraying through nozzles 56, 58 to provide a cooled recycle stream.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

I claim:

1. A relatively high pressure process for the treatment of low-volume, high-solids wastewater having generally high BOD and phosphorus concentration comprising the steps of:

(a) introducing high-solids wastewater feed having a water fraction and a solids fraction at a predetermined elevated process pressure of from about 3 atmospheres to about 10 atmospheres;

(b) subjecting said wastewater to an anaerobic treatment step under said elevated process pressure for reducing the phosphorus content in the water fraction and transferring phosphorus to the solids fraction;

(c) subjecting said wastewater to an aerobic treatment step under said elevated process pressure including added aeration oxidant wherein said added aeration oxidant is in the form of ambient air compressed to the predetermined elevated process pressure;

(d) maintaining pressurized aerobic condition in said wastewater during agitation thereof to produce related wastewater in which the BOD is reduced to a predetermined value; and (e) discharging treated wastewater liquid and solid effluent.

2. The process of claim 1 further comprising the step of adding an amount of said discharged wastewater or settled solids to said anaerobic means for maintaining a desired solids content in said anaerobic means.

3. The process of claim 1 including the step of subjecting said wastewater to high-agitation mixing during said aerobic treatment.

4. The process of claim 1 further comprising the step of separating said water fraction and said solids fraction during or after discharging treated wastewater.

5. The process of claim 1 wherein said wastewater is subjected to said anaerobic treatment for a time from about one-half to one hour.

6. The process of claim 1 wherein said aerobic treatment is carried out until said BOD is reduced to a value of one-half the input value or less.

7. The process of claim 1 wherein said wastewater is subjected to said aerobic treatment for from about 2 to about 60 hours.

8. The process of claim 1 wherein the wastewater influent is fed from a barn or feedlot flushing operation,

9. The process of claim 1 wherein said process pressure is from about 5 atmospheres to about 7 atmospheres.

10. The process of claim 1 wherein said anaerobic treatment step precedes said aerobic treatment step.

11. The process of claim 1 further comprising adding a minor amount of said wastewater from said aerobic treatment step to material in said anaerobic treatment sufficient to assure anaerobic bacterial activity upon depletion of the oxygen therein.

12. The process of claim 1 wherein the BOD of said wastewater feed is at least 10,000.

13. A system for the pressurized treatment of high solids wastewater having relatively high BOD and P concentration comprising:

(a) means for receiving high solids wastewater feed having a solid fraction and a water fraction from a source thereof;

(b) pressurizing means for elevating the pressure of said system to a predetermined elevated process pressure;

(c) anaerobic treatment means in said pressurized system including bacteria that act anaerobically for subjecting said wastewater to an anaerobic phosphorus transfer treatment for reducing the phosphorus content in the water fraction by transfer of phosphorus to the solid fraction;

(d) aerobic treatment means in said pressurized system including oxidant supply means for supplying compressed ambient air into said pressurized system and agitation means for maintaining agitation in aerated wastewater; and (e) discharging means for discharging treated wastewater to atmospheric pressure.

* * * * *